United States Patent
Tsai

(10) Patent No.: US 6,305,323 B1
(45) Date of Patent: Oct. 23, 2001

(54) APPARATUS AND A METHOD AND SYSTEM OF REARING ABALONE

(76) Inventor: Pao-Ling Tsai, No. 41, Alley 66, Lane 155, Tun Hwa N. Road, Taipei (TW)

( * ) Notice: Subject to any disclaimer, the term of this patent is extended or adjusted under 35 U.S.C. 154(b) by 0 days.

(21) Appl. No.: 09/495,381

(22) Filed: Feb. 1, 2000

(30) Foreign Application Priority Data

| Aug. 26, 1999 | (TW) | 88214571 |
| Sep. 8, 1999 | (TW) | 88115510 |
| Dec. 2, 1999 | (TW) | 88214571 |

(51) Int. Cl.⁷ .................................................. A01K 61/00
(52) U.S. Cl. ............................................. 119/234; 119/236
(58) Field of Search ................................. 119/224, 226, 119/227, 234, 236, 238, 242, 243; 210/169, 747

(56) References Cited

U.S. PATENT DOCUMENTS

| 3,196,833 | * | 7/1965 | Glancy | 119/236 |
| 3,771,492 | * | 11/1973 | Doherty | 119/226 |
| 4,183,322 | * | 1/1980 | Shultz et al. | 119/236 |
| 4,226,210 | * | 10/1980 | Lockwood et al. | 119/236 |
| 4,257,351 | * | 3/1981 | Scura et al. | 119/234 |
| 5,377,624 | * | 1/1995 | Craig et al. | 119/234 |
| 5,558,042 | * | 9/1996 | Bradley et al. | 119/226 |
| 5,660,142 | * | 8/1997 | Van Rijn | 119/226 |
| 5,820,759 | * | 10/1998 | Stewart et al. | 210/747 |
| 5,961,831 | * | 10/1999 | Lee et al. | 119/227 |

* cited by examiner

Primary Examiner—Peter M. Poon
Assistant Examiner—Elizabeth Shaw
(74) Attorney, Agent, or Firm—Dougherty & Troxell

(57) ABSTRACT

The present invention relates to an apparatus and a method rearing abalone. The apparatus comprises a water channel defining by lateral sides, the top edge of the individual longer lateral side being mounted with a reinforcing board; a plurality of partitioning boards having a plurality of holes thereon, and the top end of the board being extended with two clipping boards, a gap formed in between the two clipping boards and providing engagement with the reinforcing boards, the top of the upper clipping plate being provided with at least one hole for the mounting of a pin so as to fasten the partitioning board onto the reinforcing board and forming into a plurality of rearing troughs; and a water channel liner being mounted at the front end of the water channel. Further, a semi-automatic feeding machine may be used for replacing manual labor to feed the abalone.

10 Claims, 13 Drawing Sheets

APPARATUS AND A METHOD AND SYSTEM OF REARING ABALONE

BACKGROUND OF THE INVENTION

1. Field of the Invention

The present invention relates to an apparatus, a method and a system of rearing abalone, and in particular, a method of rearing which provides the abalone growing under minimal handling and disturbance. Thus, it decreases the abalone's mortality rate, promotes growth rate. It improves land-based abalone aquaculture to become more effective and economical.

2. Description of Related Art

A number of system have been developed to provide abalone rearing. As shown in FIG. 1, a conventional rearing trough 20' comprises a plurality of water troughs 211' connected with one another to form a water channel 21'. The water channel 21' is placed onto supports 24' of various heights. The young abalone 10' are settled into each of the water troughs 211' for rearing. However, such conventional method, apparatus and system used for abalone rearing have the following drawbacks:

1) As the water channel 21' of the rearing trough 20' comprises a plurality of water troughs 211' connected together in series, the water channel 21' has to be placed onto a plurality of supports 24' of different heights. This rearing trough 20' occupies space and the rearing area has not been fully utilized. Further, a large number of supports 24' are required for the rearing trough 20'. Thus, the cost of building a rearing site is high and the productivity of abalone is low.

2) The length of the water trough 211' of the water channel 21' is fixed and there is no partitions within the water trough 211'. The abalone are reared in a same water trough 211' throughout from young abalone stage until a mature abalone. Thus, this causes either an insufficient use of the rearing area, or insufficient area of growth, where the abalone are needed to be transferred for further rearing at a later stage. However, this will confuse abalone growing procedures.

3) As the space within the water trough 211' is limited, only when the young abalone becomes a mature abalone, new young abalone cannot be settled into the water trough 211'. Thus, the cost of production is high and the efficiency of production is low.

4) In abalone harvest, these abalone have to be collected one by one manually from the water trough 211'. The harvest operation is not convenient and the procedures of harvest are complicated. Thus, the cost of labor is high.

5) As the water trough 211' is a U-shaped structure, the abalone may crawl out from the water trough 211' and die. Thus, the fatality rate of abalone is high.

6) The conventional rearing trough 20' only utilizes manual power to supply feeds to the abalone thereby requiring a lot of manual labor and disturbing the abalone with external force and light and therefore increasing the cost and increasing the dying rate of the abalone.

SUMMARY OF THE INVENTION

Accordingly, it is an object of the present invention to provide an apparatus and a method of rearing abalone, wherein a plurality of partitioning boards are provided across a water channel to form a plurality of water troughs of various sizes, i.e., from larger size, and subsequently to smaller size troughs. The position of the partitioning boards is adjustable within the water channel to provide sufficient rearing space and to avoid overcrowded and insufficient of feeds for rearing. In addition, the numbers of water troughs are dependent on the growing time of the rearing abalone, and abalone of different size can be reared along the same water channel. A water channel liner is provided at the front end of the water trough such that the mature abalone (of certain size suitable for harvest) can be easily collected by withdrawing the water channel liner. A small portion of anaesthetic is sprayed into the liner to cause the abalone which are adhered to the liner to release from the liner without manually collecting the abalone.

Yet another object of the present invention is to provide an apparatus and a method of rearing abalone, wherein the length of the water channel can be adjusted and the area of rearing can be sufficiently utilized.

It is yet another object of the present invention to provide an apparatus and a method of rearing abalone, wherein the top edge of the water channel is provided longitudinally with a reinforcing board to prevent the abalone from crawling out from the water trough.

Yet another object of the present invention is to provide an apparatus and a method of rearing abalone, wherein a filtering device is used to purify sea water and the purified water is transferred to the water channel and the used rearing water, after passed through a smaller water trough, is directly collected in a precipitation tank to precipitate out large particles within the used rearing water. The water is then passed through a mechanical filtering pond and a biological filtering bed to remove afloat particles and other toxic materials.

A further object of the present invention is to provide an apparatus and a method of rearing abalone, wherein referring to FIG. 5, a semi-automatic feeding machine is arranged between the water channels, which can move to and forth along the passage and move vertically to supply feed to the abalone in the water trough and can be moved to the other passage for supplying feed to the abalone in other water troughs thereby reducing the manual labor to operate the rearing troughs and preventing the abalone from being disturbed by external force and light and therefore increasing the rearing efficiency and lowering the production cost.

BRIEF DESCRIPTION OF THE DRAWINGS

The present invention can be more fully understood by referring to the following description and accompanying drawing, in which.

DETAILED DESCRIPTION OF THE PREFERRED EMBODIMENT

Figure 1:
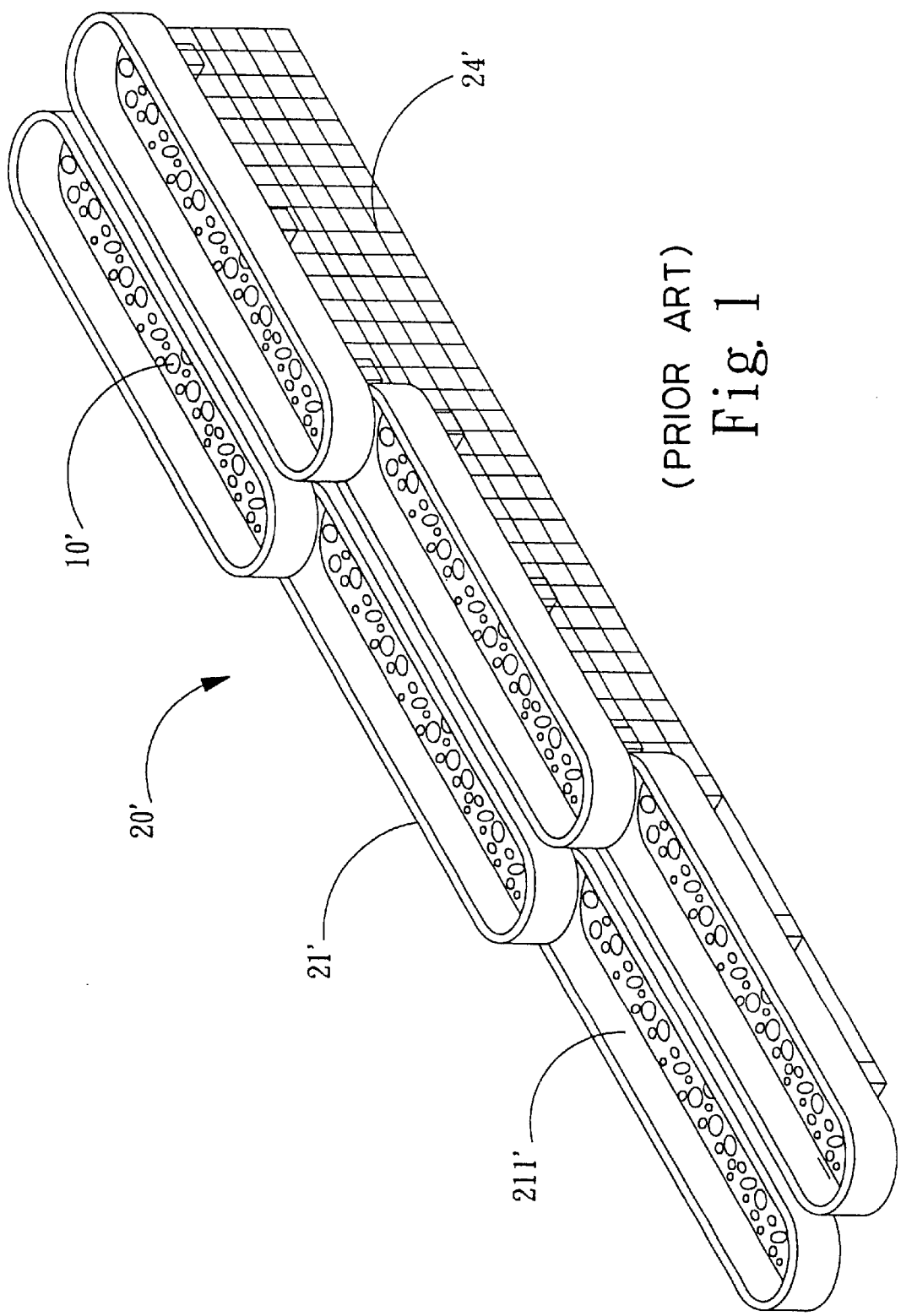
FIG. 1 is a perspective view of a conventional rearing trough.
Figure 2:
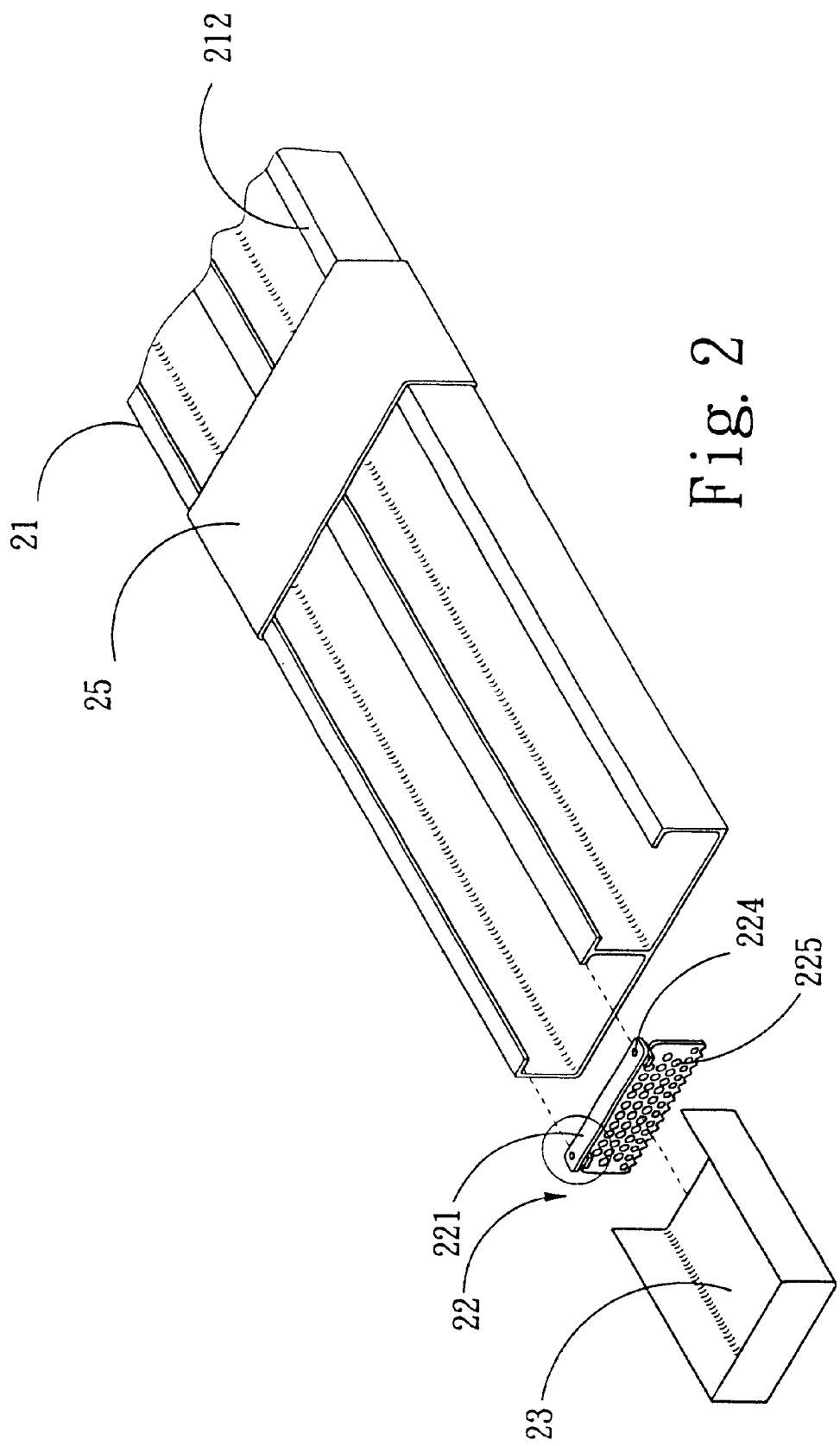
FIG. 2 is a perspective exploded view of the rearing water channel in accordance with the present invention.
Figure 3:
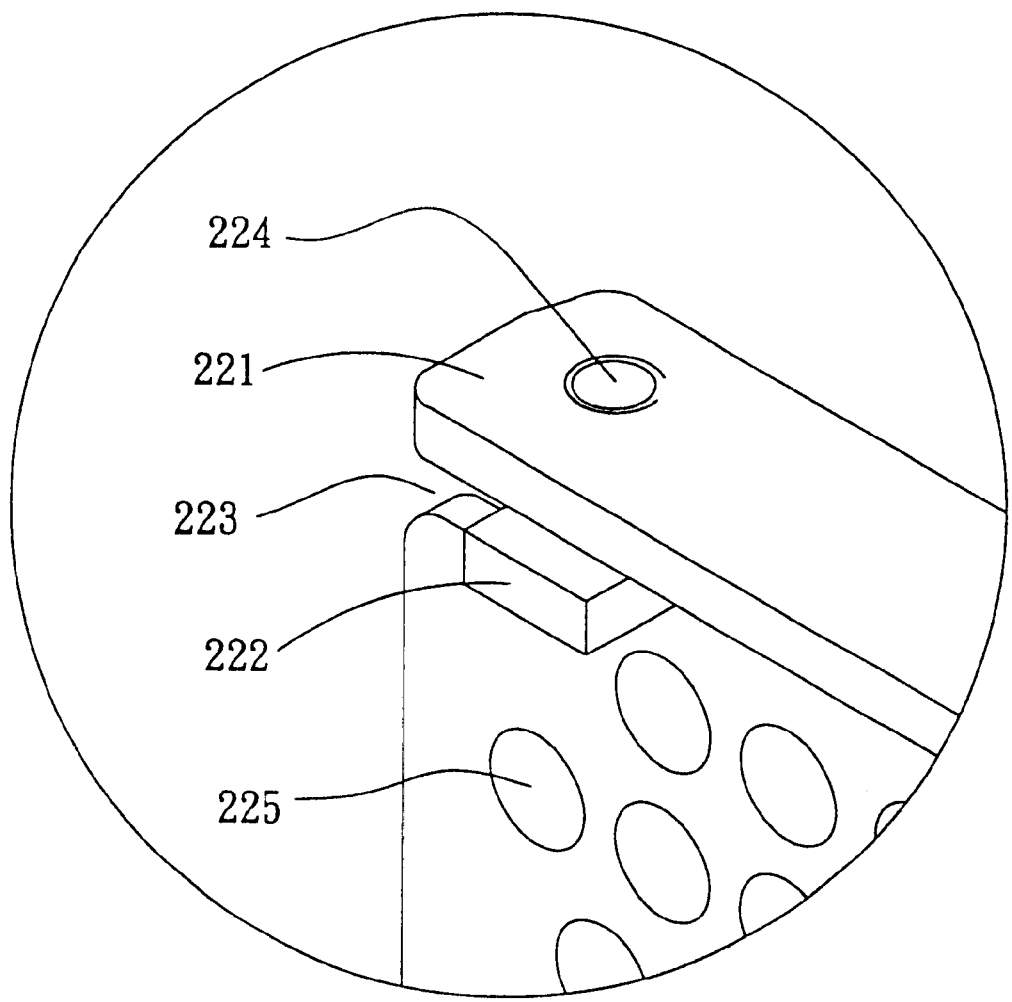
FIG. 3 is a partial enlarged view of the partitioning board of water channel in accordance with the present invention.
Figure 4:
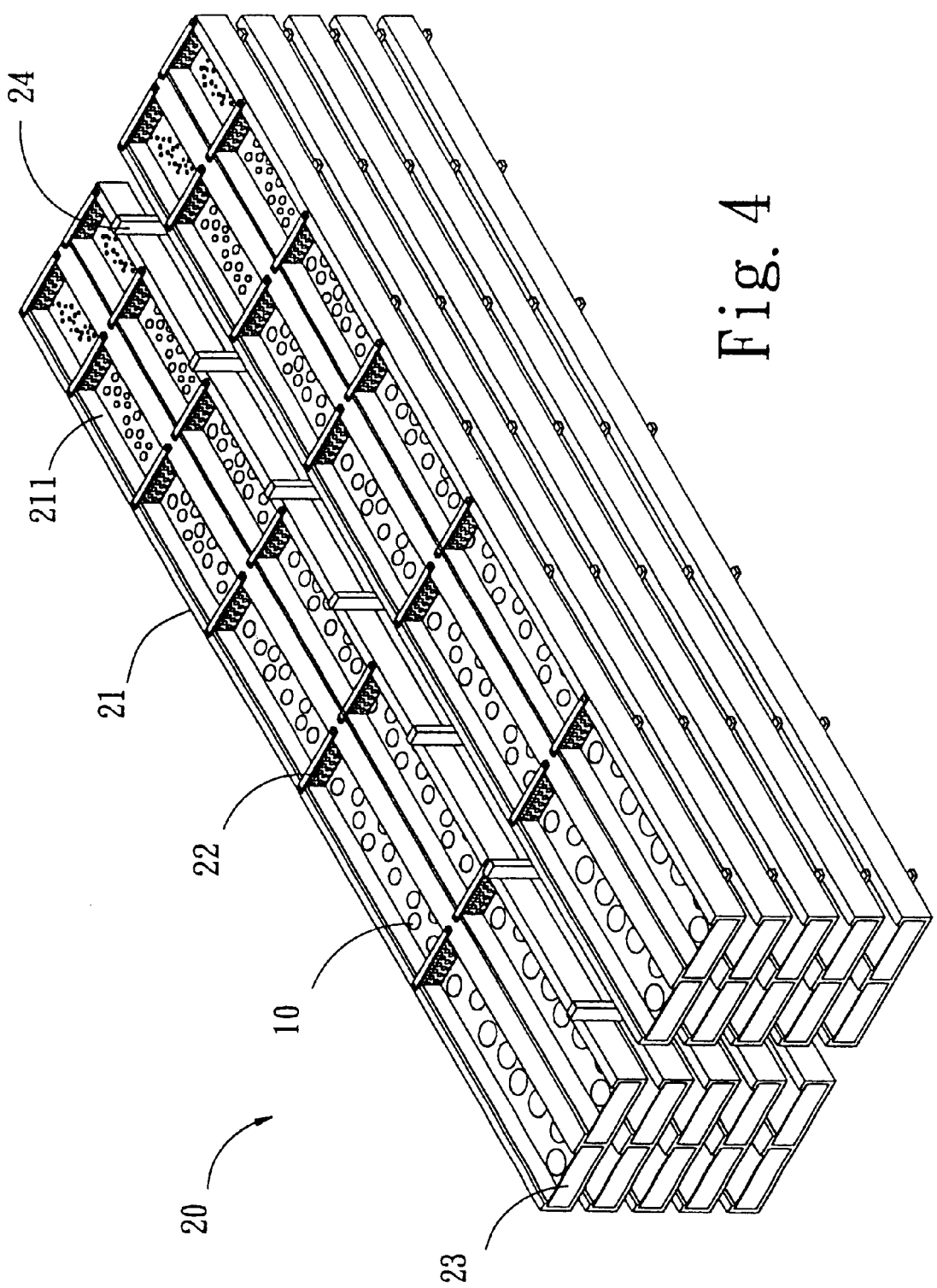
FIG. 4 is a perspective view of the rearing trough in accordance with the present invention.

Referring to FIGS. 2, 3 and 4, there is shown a rearing trough 20 comprising a plurality of water channels 21. The channel 21, defining by lateral sides, is of appropriate length and is substantially a U-shaped structure. At the respectively top edge of the individual longer lateral sides of the water channel 21, a reinforcing board 212 is provided longitudinally thereto. A plurality of partitioning boards 22 are provided across the water channel 21 to form a plurality of water troughs 211 of decreasing sizes. A plurality of holes 225 are provided on the partitioning boards 22, and the top end thereof is extended to form a top and a bottom clipping board 221, 222. There is a gap 223 in between the top clipping board 221 and the bottom clipping board 222. The gap 223 is functioned to engage with the reinforcing board 212. At least a hole 224 is provided on the top clipping board 221, closing to the end thereof, for the insertion of a pin 26. The front end of the water trough 211 is provided with a water channel liner 23, which is substantially a U-shaped structure and can be withdrawn from the water trough 211 easily.

A water channel connector 25 is provided at the ends of the water channel 21 to enable extension by a plurality of water channels 21 so as to increase the length thereof. Thus, the number of water trough 211 is increased. A plurality of water channels 21 are respectively mounted onto a plurality of supports 24 so as to form into a rearing device for abalone in accordance with the present invention.

Figure 5:
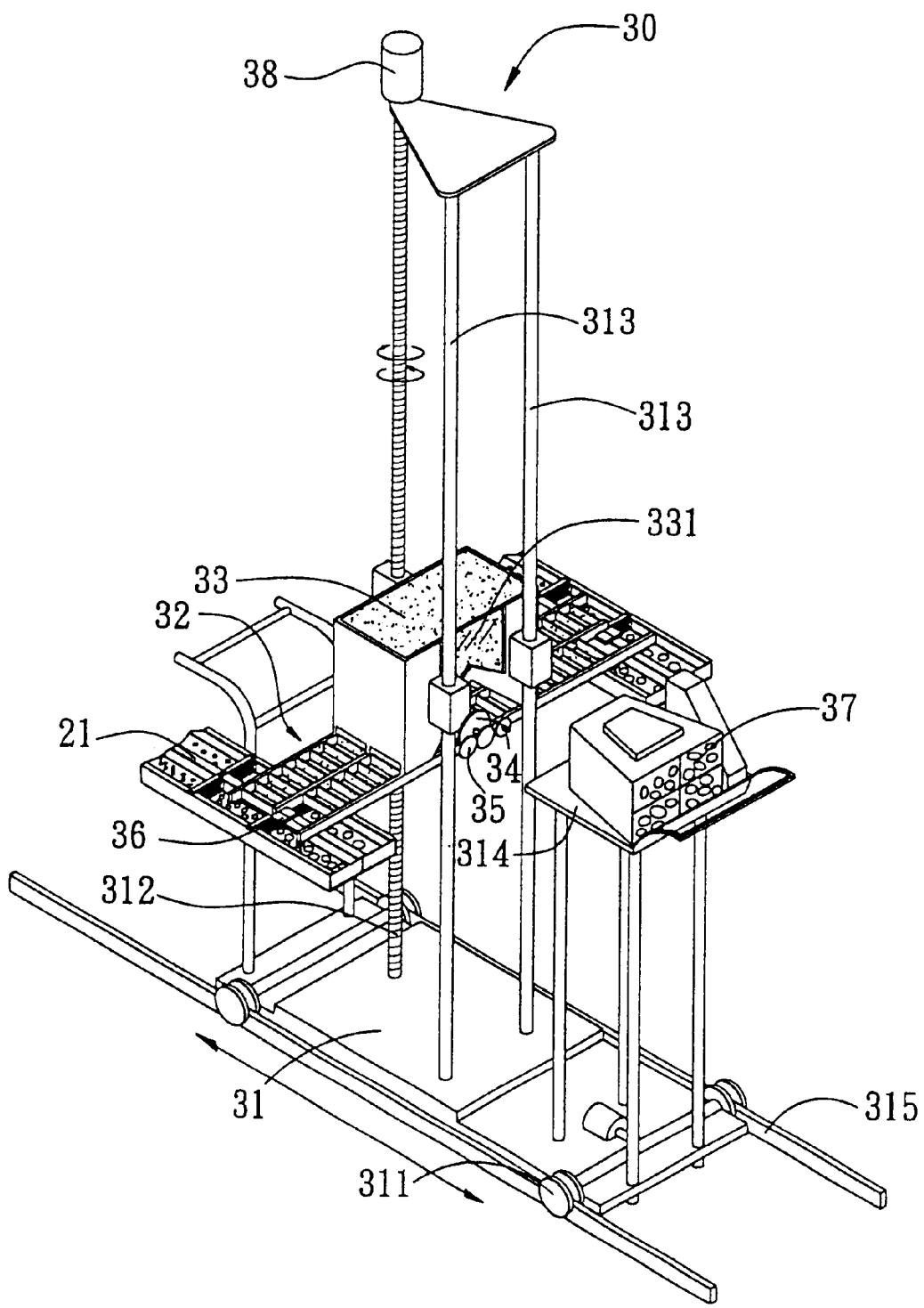
FIG. 5 is a perspective view of semi-automatic feeding machine in accordance with the present invention.
Figure 6:
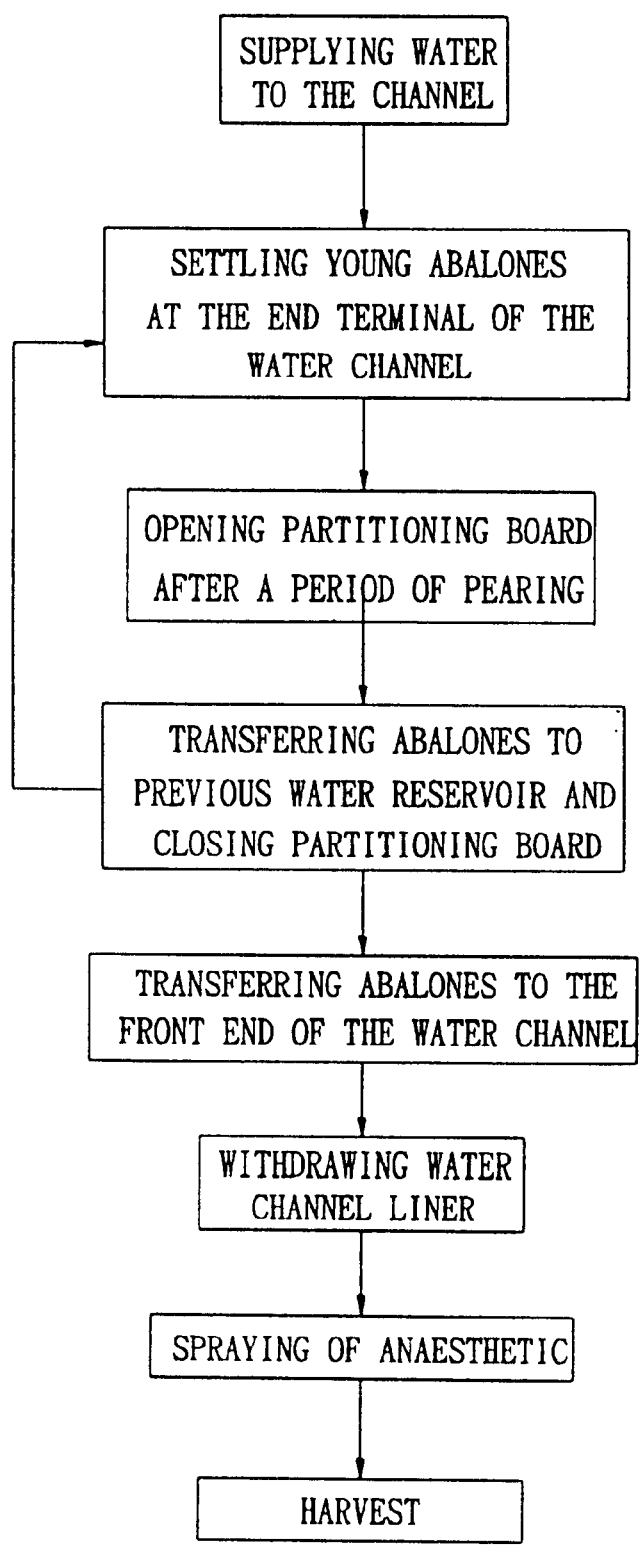
FIG. 6 is a flowchart illustrating the rearing of abalone in accordance with the present invention.

Referring to FIG. 5, a semi-automatic feeding machine 30 is arranged between the water channels 21, which comprises the following component parts.

A base plate 31 is provided with a plurality of wheels 311 at two sides thereof which can move to and forth along two rails 315. On one side of the base plate 31 there are a lead screw 312 and two guide rods 313. A platform 314 is mounted on another side of the base plate 31. A motor 38 is mounted on the upper end of the lead screw 312 for driving the lead screw 312. A conveyor 32 is arranged between the lead screw 312 and the guide rod 313. A container 33 for receiving feed for abalone is mounted above the conveyor 32 and provided with a transparent window 331 at its one lateral side so that one may easily inspect the quantity of feed in the container thereby reminding one to add more feed in the container 33 and preventing one from adding too much feed thereto. Under the container 33 there are a motor 34 and a gear 35 for driving the conveyor 32. Both ends of the conveyor 32 are provided with a camera 36 which will monitor the conditions in the water troughs 211 of the water channel 21 through a screen 37 on the platform 314 so that the operator will be immediately informed of any abnormal conditions and may take any necessary measures to deal with these conditions.

As the motor 38 drives the lead screw 312, the container 33 and the conveyor 32 will be moved to the position above the desired water trough 211 along the lead screw 312 and the guide rods 313 for supplying feeds to the abalone therein. The quantity of feed supplied to the abalone is controlled by the moving speed of the conveyor 32 and the opening (not shown) at the bottom of the container 33. The semi-automatic feeding machine 30 not only can be moved back and forth along the passage, but also can be moved vertically to supply feed to the abalone in the water trough 211. Hence, external disturbances such as light to the abalone will be reduced and furthermore, the labor cost for feeding the abalone 10 can be decreased.

Figure 7:
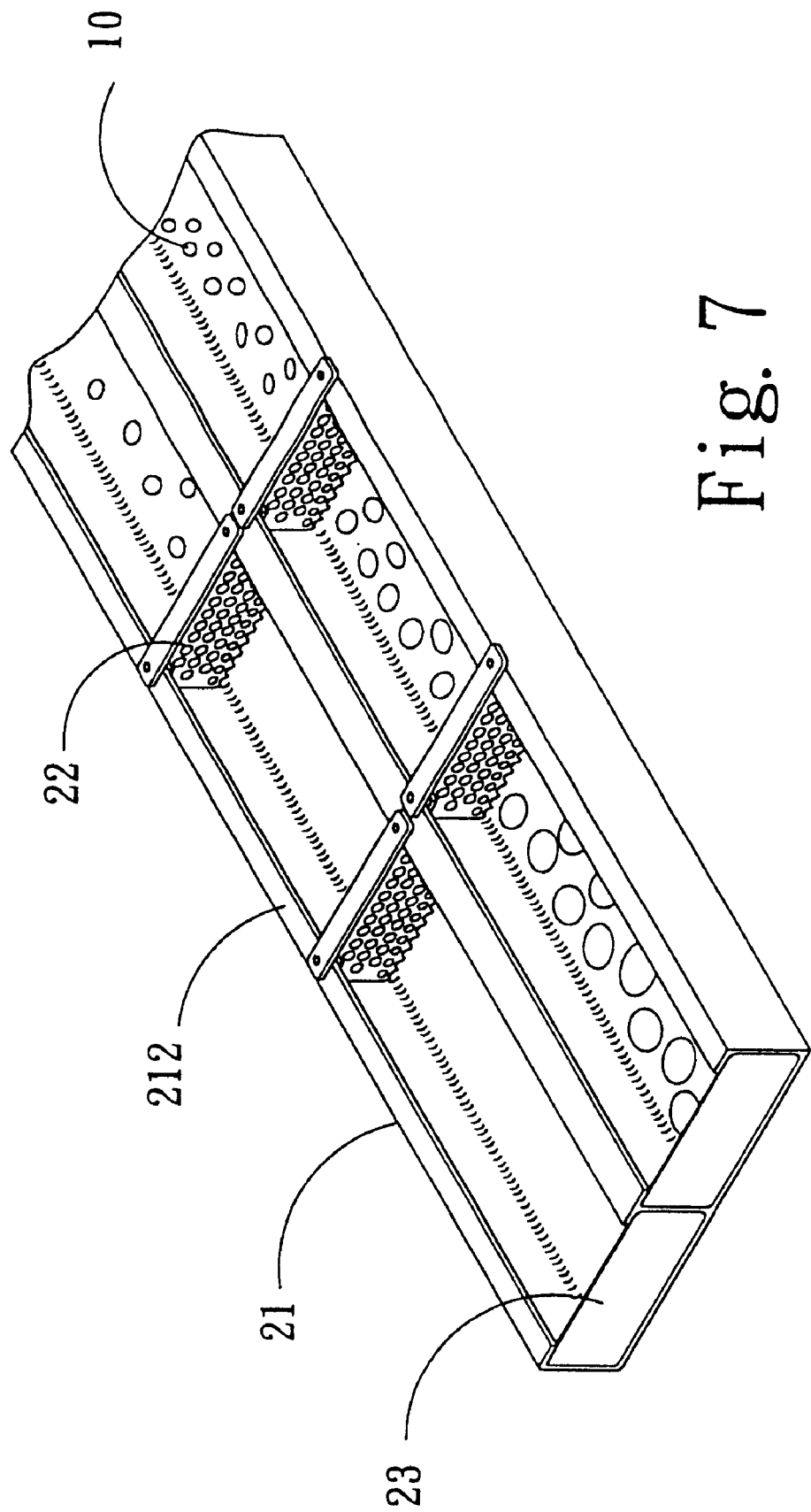
FIGS. 7 to 11 are schematic views showing the rearing of abalone in accordance with the present invention.
Figure 8:
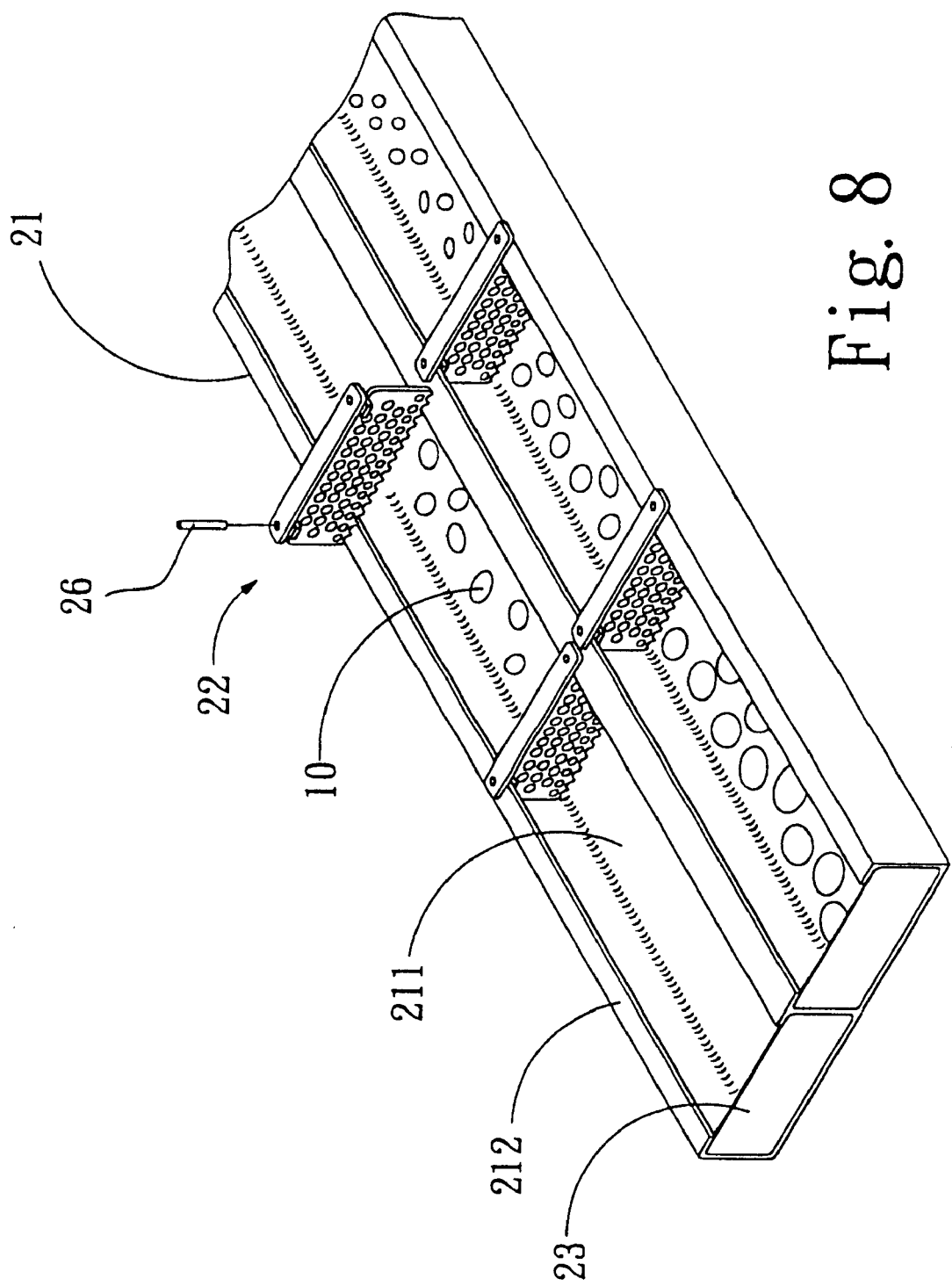
Figure 9:
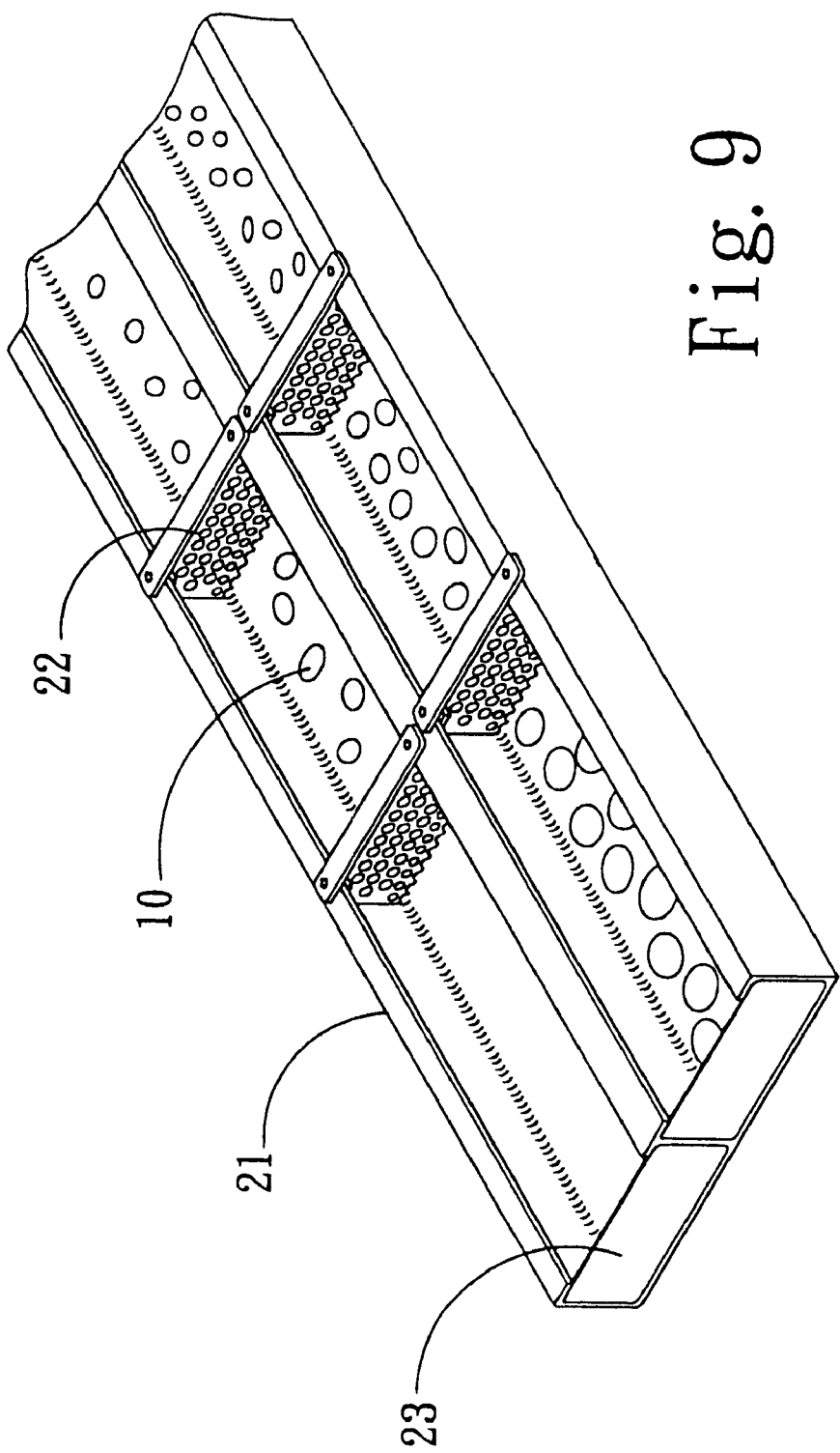
Figure 10:
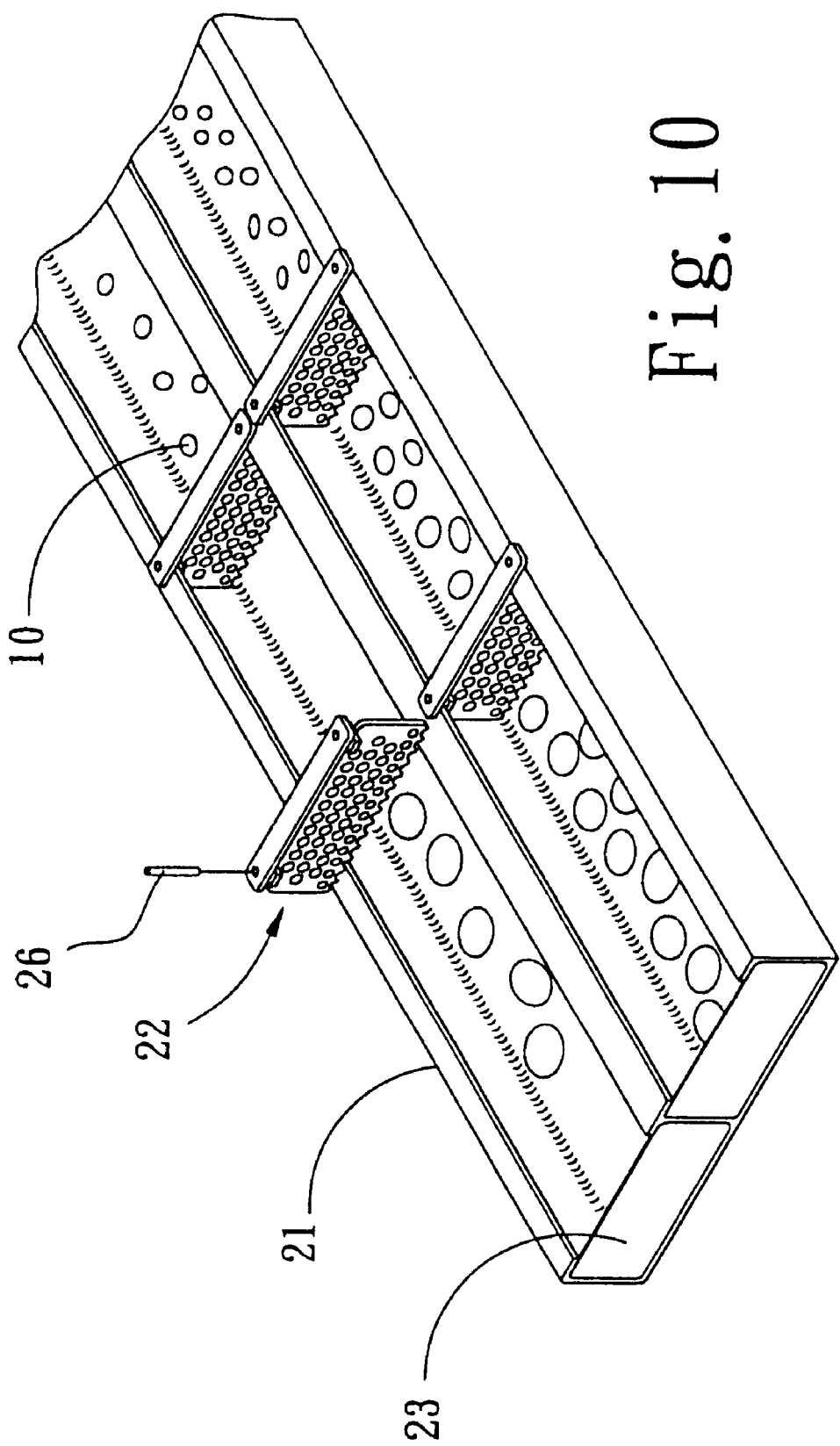
Figure 11:
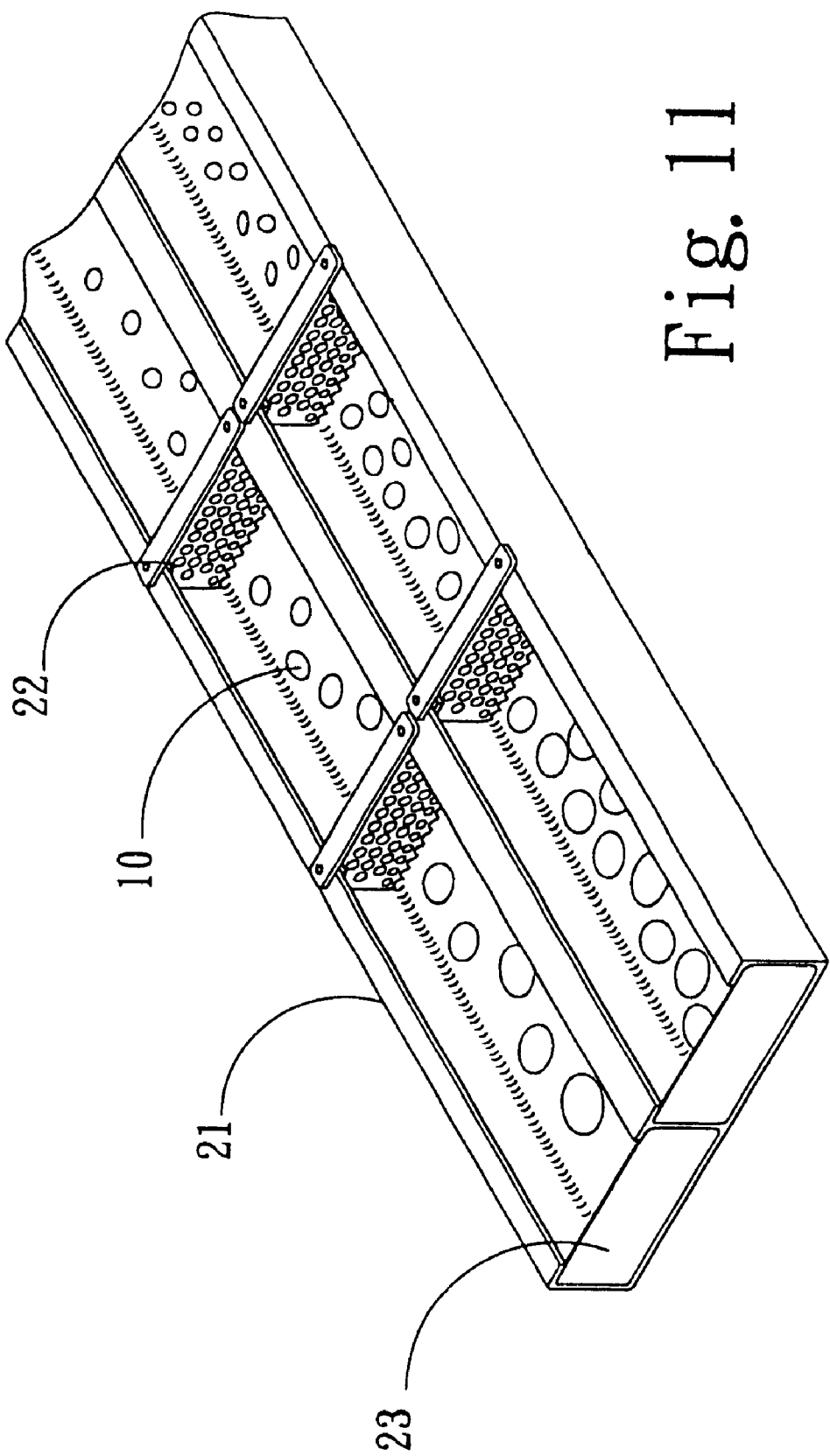

Referring to FIGS. 6 to 11, there is shown a schematic view of abalone rearing in accordance with the present invention. The method of rearing comprises the steps as follows:

a) Supplying water into the water channel 21 and young abalone are settled into a smaller water trough 211 at the end terminal of water channel 21 for rearing with feeds (Referring to FIG. 7).

b) After a period of rearing, the young abalone 10 have grown to larger sizes, and the rearing space within the water trough 211 is not sufficient for further growth. The partitioning board 22 is opened to transfer the abalone 10 to a larger side water trough 211 (Referring to FIG. 8).

c) After the abalone 10 have been totally transferred to a next water trough 211, close the partitioning board 22 and introduce young abalone into the smaller trough 211 at the end terminal of the water channel 21 (Referring to FIG. 9).

d) After the abalone have grown for a specified period, subsequently open and close the respective front and rear partitioning boards 22 such that the abalone are transferred to a next larger water channel 211 (Referring to FIG. 10).

e) After the abalone have been transferred to the water channel liner 23 at the front end of the water trough 211, the abalone 10 have grown to the stage of appropriate size and are ready for harvest. The water channel liner 23 is withdrawn, and a little anaesthetic is sprayed therein to separate the abalone from attaching to the liner 23, so that the abalone 10 can be collected (Referring to FIG. 11).

In view of the above method, abalone 10 of different sizes can be reared within the same water channel 21. Further, the rate of replacement of water for abalone rearing is rapid and wastes of the abalone are completely cleaned and discharged. Thus, the environment of abalone-rearing is not polluted. In feeding, the abalone 10 intake feeds easily and the method of harvest the mature abalone is simple. As a result, the gathering of abalone can be done at one time, and labor cost and time are saved. Thus, the production rate is effective and high.

Figure 12:
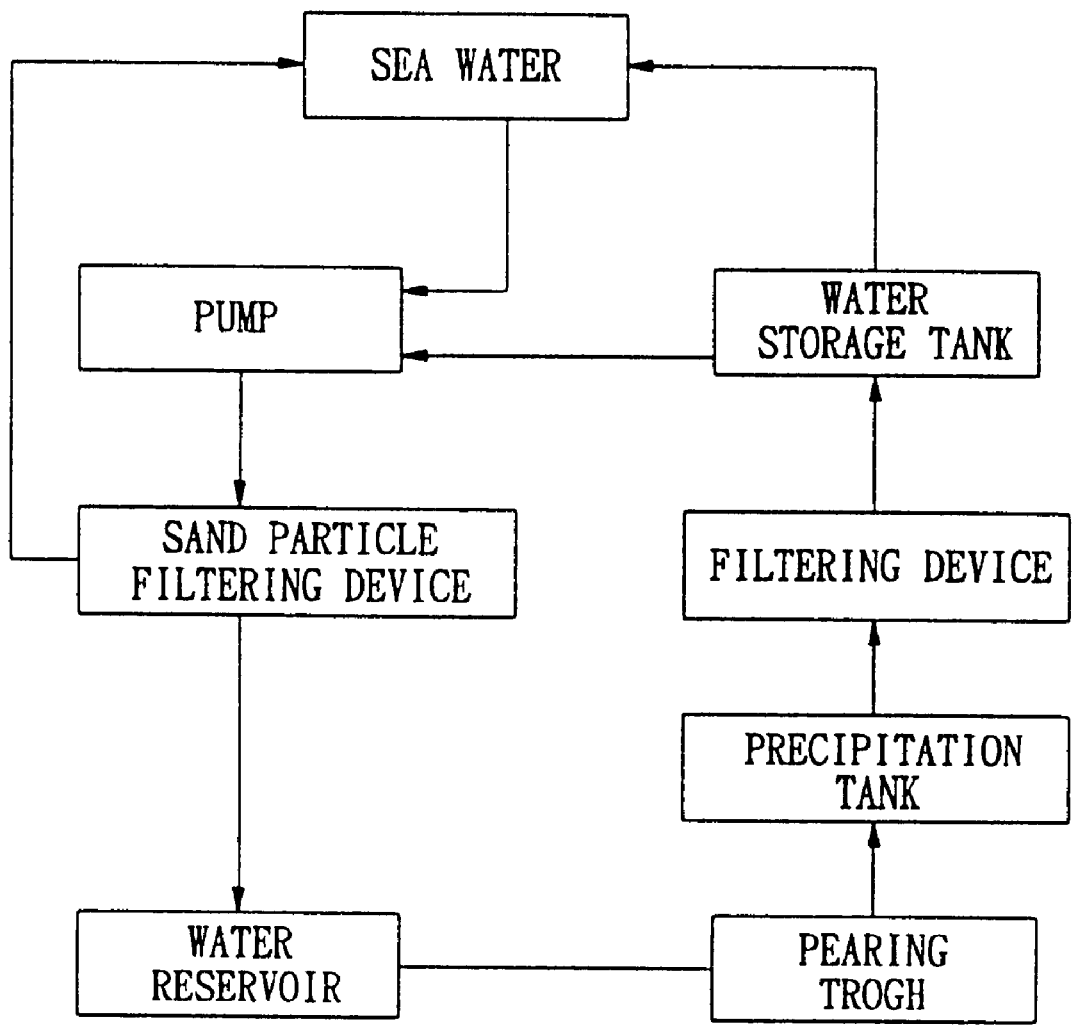
FIG. 12 is a system flowchart of the present invention.
Figure 13:
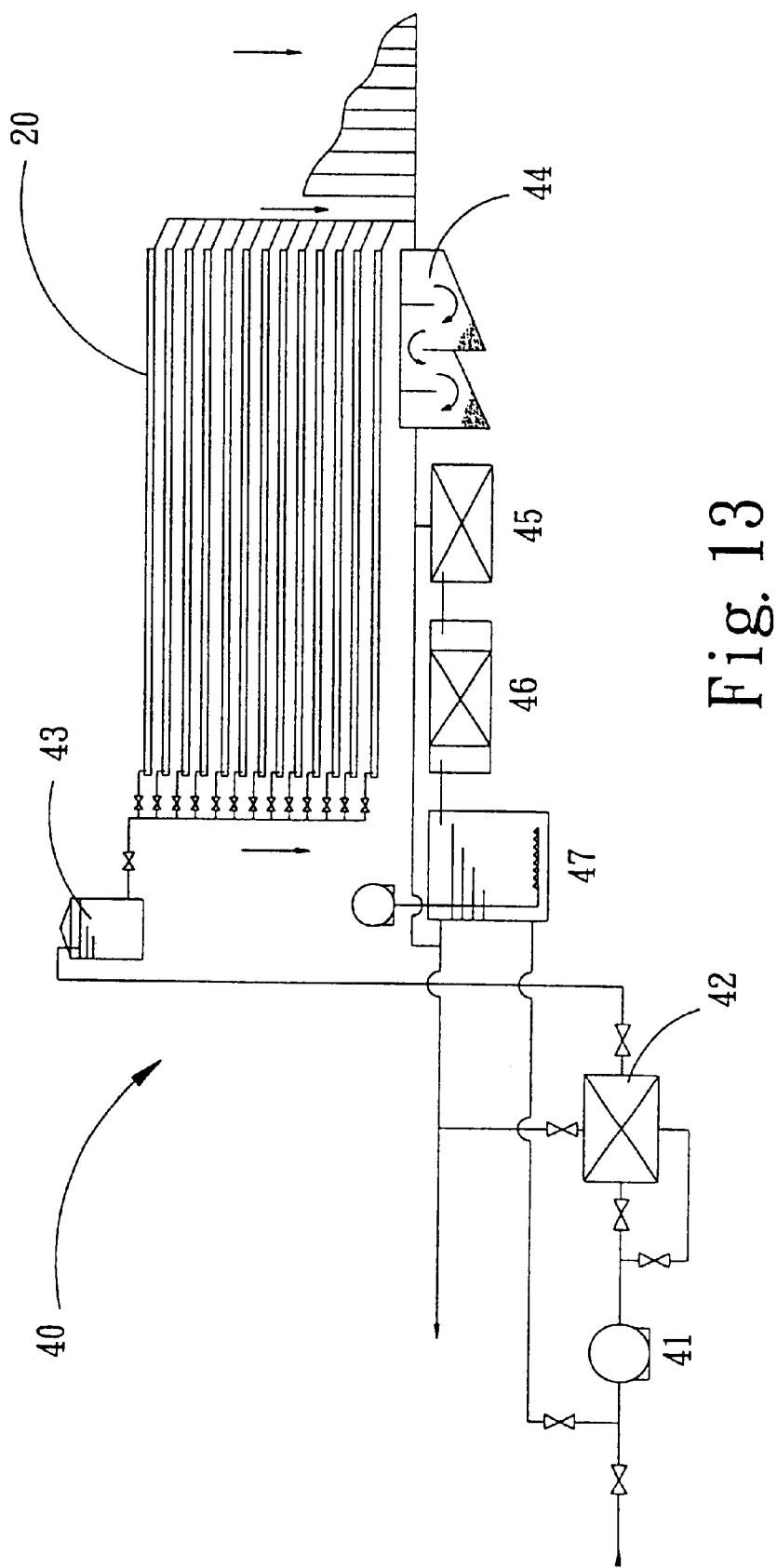
FIG. 13 is a schematic view of the system flowchart of the present invention.

Referring to FIGS. 12 and 13, there is shown the system flowchart of abalone rearing in accordance with the present invention. In accordance with the present invention, the system illustrating by the flowchart comprises a) a pump 41 to supply sea water to the water channel;

b) a sand particle filtering device 42 being used to purify sea water for abalone rearing and the purified water being transferred to a water reservoir 43, and the impure sea water being recycled and discharged into the sea, the purified rearing water passed across the rearing trough 20 to the smaller size trough 20 for abalone 10 rearing;

c) a precipitation tank 44 being used to collect the used rearing water and the larger particles being precipitated within the precipitation tank 44;

d) a mechanical filtering pond and a biological filtering bed being used to remove the afloat particles and toxic materials so that the water can be re-used as rearing water; and e) a water storage tank 47 being used to collect the rearing water of step d) or the rearing water being discharged to the sea.

In accordance with the present invention, the above steps are repeated to proceed with the abalone rearing.

In accordance with the above abalone rearing system, bacterial is settled into the biological filtering bed. The bacterial absorbs the toxic materials present in the rearing water such that the rearing water can be re-used. Thus, the amount of water used from abalone rearing is greatly reduced and the cost of water is saved.

Although exemplary embodiment of the invention has been described with reference to particular structures, it is to be understood that various modifications can be made thereto without departing form the spirit and scope of the invention. Accordingly, the invention is not limited by the above description but only by the attached claims.

What is claimed is:

1. An apparatus for rearing abalone, comprising
    a) a water channel member having elongated lateral sides, a top edge of each of the lateral sides having a reinforcing board thereon;
    b) a plurality of partitioning boards in the water channel member each having a plurality of holes therein, top ends of the boards forming two extended upper and lower clipping boards forming a gap therebetween and engaging the reinforcing boards, the upper clipping board having at least one hole accommodating a pin so as to fasten the partitioning boards onto the reinforcing boards and thereby forming a plurality of rearing troughs of decreasing size; and
    c) a water channel liner mounted at a front end of the water channel member.

2. The apparatus for rearing abalone as defined in claim 1, wherein the water channel member is formed by connecting two substantially U-shaped structures.

3. The apparatus for rearing abalone as defined in claim 1, wherein the plurality of holes on the partitioning boards are of different diameters.

4. The apparatus for rearing abalone as defined in claim 2, wherein a water channel connector connects the two substantially U-shaped structures.

5. The apparatus for rearing abalone as defined in claim 1, comprising a plurality of water channel members arranged on a frame to form a rearing trough.

6. The apparatus for rearing abalone as defined in claim 1, further comprising: a plurality of spaced apart water channel members forming a passage therebetween; and a semi-automatic feeding machine located between the spaced apart water channel members and movable along the passage and movable vertically to supply feed to the water channel members.

7. The apparatus for rearing abalone as defined in claim 1, wherein the plurality of water channel members are spaced apart forming a passage therebetween and comprising a semi-automatic feeding machine located between the spaced apart water channel members and movable along the passage and movable vertically to supply feed to the water channel members.

8. The apparatus for rearing abalone as defined in claim 6, wherein said semi-automatic feeding machine comprises a base plate provided with plurality of wheels so as to be movable on two rails, a lead screw and two guide rods mounts on the base plate, a platform mounted on the base plate, a conveyor arranged between the lead screw and the guide rods, a container for receiving feeds mounted above the conveyor, and cameras installed on opposite ends of the conveyor for monitoring conditions in the water channel members through a screen on the platform so that an operator will be timely informed of any abnormal conditions and may take any necessary measures to deal with the abnormal conditions.

9. The apparatus for rearing abalone as defined in claim 7, wherein said semi-automatic feeding machine comprises a base plate provided with plurality of wheels so as to be movable on two rails, a lead screws and two guide rods mounts on the base plate, a platform mounted on the base plate, a conveyor arranged between the lead screw and the guide rods, a container for receiving feeds mounted above the conveyor, and cameras installed on opposite ends of the conveyor for monitoring conditions in the water channel members through a screen on the platform so that an operator will be timely informed of any abnormal conditions and may take any necessary measures to deal with the abnormal conditions.

10. A method of rearing abalone, comprising the steps of
    a) supplying water into a water channel and introducing young abalone into a small water trough at an end terminal of the water channel for rearing;
    b) rearing the young abalone for a predetermined period to obtain a larger size young abalone, opening a partitioning board to transfer the young abalone to a next larger water trough;
    c) closing the partitioning board and introducing young abalone to the small trough at the end terminal of the water channel for rearing;
    d) rearing the young abalone for a predetermined period, subsequently opening and closing the partitioning boards so that the young abalone are transferred to a next larger water trough; and continuously introducing young abalone into the small water trough at the end terminal for rearing;
    e) transferring mature abalone to a water channel liner at a front end of the water trough and removing the water channel liner; and
    f) spraying an anaesthetic into the water channel liner facilitating harvest of mature abalone.

\* \* \* \* \*